United States Patent
Kimura et al.

(10) Patent No.: US 8,265,183 B2
(45) Date of Patent: *Sep. 11, 2012

(54) RADIO COMMUNICATION APPARATUS AND COMMUNICATION METHOD

(75) Inventors: Dai Kimura, Kawasaki (JP); Tetsuhiro Futami, Kawasaki (JP); Yoshihiro Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 210 days.

This patent is subject to a terminal disclaimer.

(21) Appl. No.: 12/606,747

(22) Filed: Oct. 27, 2009

(65) Prior Publication Data

US 2010/0040086 A1 Feb. 18, 2010

Related U.S. Application Data

(63) Continuation of application No. 11/808,541, filed on Jun. 11, 2007, now Pat. No. 7,609,775, and a continuation of application No. PCT/JP2004/018611, filed on Dec. 24, 2004.

(51) Int. Cl.
*H04L 27/28* (2006.01)

(52) U.S. Cl. ...................................... 375/260

(58) Field of Classification Search .................. 375/260, 375/130, 261, 354, 341; 370/208, 210, 355, 370/474, 458
See application file for complete search history.

(56) References Cited

U.S. PATENT DOCUMENTS

| | | | |
|---|---|---|---|
| 6,115,354 | A | 9/2000 | Weck |
| 6,714,511 | B1 | 3/2004 | Sudo et al. |
| 7,317,747 | B2 * | 1/2008 | Miyazaki et al. ............. 375/136 |
| 7,403,471 | B2 | 7/2008 | Sudo et al. |
| 7,609,775 | B2 * | 10/2009 | Kimura et al. ................ 375/260 |
| 2003/0090994 | A1 | 5/2003 | Kakura |
| 2003/0147358 | A1 | 8/2003 | Hiramatsu et al. |
| 2004/0109419 | A1 | 6/2004 | Sano et al. |
| 2005/0099939 | A1 | 5/2005 | Huh et al. |
| 2006/0250935 | A1 | 11/2006 | Hamamoto et al. |
| 2007/0053280 | A1 | 3/2007 | Uesugi |

FOREIGN PATENT DOCUMENTS

EP 0762701 3/1997

(Continued)

OTHER PUBLICATIONS

European Patent Office Supplementary European Search Report with Annex, issued for corresponding European Patent Application No. 04806972.8, dated May 23, 2011.

(Continued)

*Primary Examiner* — Khai Tran

(74) *Attorney, Agent, or Firm* — Myers Wolin, LLC

(57) ABSTRACT

In a radio communication apparatus for forming a frame with a plurality of slots, and inserting a guard interval into each slot along with data for a mobile station to perform communication, a receive state acquisition section acquires a receive state of each mobile station, a frame format decision section decides a frame format of which guard interval length is different for each slot based on the receive state of each mobile station, a slot assignment section assigns each slot of the frame format to data for each mobile station, and a frame format reporting section reports the decided frame format to the mobile stations via a reporting channel. The mobile station identifies the GI length based on the reported frame format and the slot number, removes the guard interval, and performs processing.

21 Claims, 16 Drawing Sheets

FOREIGN PATENT DOCUMENTS

| | | |
|---|---|---|
| EP | 1 298 948 | 4/2003 |
| JP | H09512156 | 12/1997 |
| JP | 10-327122 | 12/1998 |
| JP | 2001-069110 | 3/2001 |
| JP | 2002/135230 | 5/2002 |
| JP | 2002-247005 | 8/2002 |
| JP | 2002-374223 | 12/2002 |
| JP | 2008-502224 | 1/2008 |
| WO | 97/30531 | 8/1997 |
| WO | 2004/077712 | 9/2004 |
| WO | 2004077712 | 9/2004 |
| WO | 2005/122517 | 12/2005 |

OTHER PUBLICATIONS

Japanese Patent Office Notice of Reasons for Refusal for corresponding Japanese Patent Application No. 2006-548597, issued Aug. 14, 2009. English Translation attached.

Notification of Reason for Refusal issued for corresponding Japanese Patent Application No. 2009-236833 dispatched on Jul. 3, 2012 with English translation.

\* cited by examiner

RADIO COMMUNICATION APPARATUS AND COMMUNICATION METHOD

CROSS-REFERENCE TO RELATED APPLICATION

This application is a continuation of U.S. patent application Ser. No. 11/808,541 filed on Jun. 11, 2007, now pending, which is a continuation of international application PCT/JP2004/018611, filed on Dec. 14, 2004, the entire contents of both applications are incorporated herein by reference.

BACKGROUND OF THE INVENTION

The present invention relates to a radio communication apparatus and a communication method, and more particularly to a radio communication apparatus and a communication method for forming a frame with a plurality of slots and inserting a guard interval into each slot along with data for a mobile station to perform communication.

An example of a radio communication system using a guard interval is an orthogonal frequency division multiplexing (OFDM) radio communication system. An OFDM radio communication system is a system which multiplies each of a plurality of orthogonal frequencies (sub-carriers) by a symbol (data), then performs inverse Fourier transform, and since the sub-carriers are orthogonal to one another on the frequency axis, a symbol can be individually acquired for each sub-carrier by performing Fourier transform at the receive side.

OFDM Transmitter

FIG. 13 is a block diagram depicting an OFDM transmitter in a conventional OFDM radio communication system. An encoding section 1 encodes high-speed binary data using convolutional encoder or turbo encoder, and a modulation section 2 modulates the encoded data after interleave, using M-bits modulation such as BPSK, QPSK or 16-QAM, for example. Then a serial/parallel converter (S/P converter) 3 converts the modulated data symbol into N symbols of parallel modulated data symbols, and generates N number of sub-carrier components.

N points of inverted fast Fourier transform section 4 performs inverted Fourier transform processing (IFFT) on N number of modulated signals (sub-carrier components), which are output from the S/P converter 3, and outputs N number of time signal components in parallel. A parallel/serial converter (P/S converter) 5 converts the N number of time signal components acquired by the IFFT processing into serial data, and outputs them as an OFDM symbol. A guard interval insertion section 6 inserts a guard interval GI into this OFDM symbol, a digital/analog converter (D/A) converts the output signal from the guard interval insertion section into an analog signal, and a radio section 8 up-converts the frequency of the base band signal into a radio signal, then amplifies and transmits the radio signal into a space by an antenna 9. In the following description, a case of using fast Fourier transform FFT and inverted fast Fourier transform IFFT are used for Fourier transform and inverted Fourier transform will be described, but discrete Fourier transform DFT and inverted discrete Fourier transform IDFT may be used.

FIG. 14 is a diagram depicting a guard interval insertion. A guard interval insertion means that the end part of the OFDM symbol is copied and added to the beginning thereof. By inserting a guard interval GI, the influence of inter-signal interference ISI caused by multi-paths can be eliminated.

OFDM Receiver

FIG. 15 is a block diagram depicting an OFDM receiver in the OFDM radio communication system. A band pass filter (BPF) 11 performs filtering on a signal received by an antenna 10 to remove an unnecessary frequency component, a down-converter (D/C) 12 converts the frequency of a radio signal into a base band frequency, an analog/digital converter (not illustrated) converts the analog of the base band signal into digital, and a guard interval removal section 13 removes the guard interval. An S/P converter 14 converts a time signal, after the guard interval is removed, into N number of parallel data, and inputs the data to N points of the Fourier transform section 15. The Fourier transform section 15 performs N points of FFT processing on the N number of time signal components and outputs N number of sub-carrier components. A channel estimation section (not illustrated) performs a known channel estimation operation and estimates channel coefficients of each sub-carrier, and generates a channel compensation value, and a channel compensation section 16 multiplies N number of FFT processing results by the channel compensation value so as to decrease the influence of channel distortion. Finally, a P/S converter 17 outputs N number of sub-carrier components after channel compensation is performed, sequentially in serial, a demodulation section 18 demodulates the input signal using BPSK, QPSK or 16-QAM, for example, and a decoding section 19 decodes and outputs the input data after deinterleave.

PRIOR ART

In radio communication, multi-paths, where a plurality of reflected waves reach the receiver via different routes, are a problem. If different reflected waves reach a receiver with certain time differences, inter-symbol interference occurs due to the overlap of time adjacent symbols, which deteriorates the bit error performance. In order to prevent this, inserting a guard interval is effective, which is not limited to OFDM. In the case of OFDM, as described in FIG. 14, it is common that the end part of the OFDM symbol is copied and added to the beginning thereof as a guard interval. If the maximum delay due to multi-paths is smaller than the guard interval length, inter-symbol interference due to multi-paths can be completely removed. In this case, as the guard interval length is longer, greater influence of the delay path can be removed, but transmission efficiency, that is, bit rate decreases. Therefore it is desirable to set the guard interval length to the length of the maximum path delay. However, in the case of applying the OFDM radio communication system to a cellular system, various cell arrangements and cell radiuses must be supported, and it is impossible to determine a guard interval length which is optimum for the entire system. Also, even within a cell, an optimum guard interval length differs since the distribution of multi-paths is different depending on the location of mobile stations.

Because of this, a radio communication system which can apply a plurality of guard interval lengths was proposed, and the adaptive control of the guard interval length, depending on the radio state, has been performed. A first prior art is a system where a base station determines a guard interval length and reports this guard interval length to mobile stations, and is disclosed in JP 2000-244441A, and JP 2001-69110A.

A second prior art is a system where a mobile station determines a guard interval length and reports this guard interval length to a base station, and the base station transmits a downlink signal using the guard interval length specified by the mobile station, and is disclosed in JP 2003-152670A, and JP 10-327122A.

A third prior art is a system where a mobile station detects a guard interval length in the blind (blind detection), and is disclosed in JP 2002-247005A and JP 2002-374223A.

Applying these prior arts to a radio communication system having scheduling and adaptive modulation functions will be considered. In such a radio communication system, a base station estimates a receive quality of each mobile station by some means, and decides the assignment of data transmission to each mobile station, the modulation system for data transmission and coding rate, for each packet timing based on the channel quality. According to this decision, the base station transmits a data packet and transmission control information including mobile station identification number, modulation system, coding rate; to the mobile station. The mobile station can accurately demodulate and decode data packets transmitted to itself by first receiving the transmission control information from the base station and then receiving the data signal using the transmission control information. For example, HSDPA (High-Speed Downlink Packet Access) in W-CDMA and HDR (High Data Rate) in CDMA 2000 use this system.

HSDPA System

FIG. 16 is a diagram depicting a configuration of an HSDPA system. BS is abase station, and UE#0 and UE#1 are mobile stations. In an HSDPA system, (1) HS-PDSCH (High-Speed-Physical Downlink Shared Channel) is used as a transmission channel of packet data in a downlink radio interval. This downlink data channel is shared by a plurality of mobile stations UE#0, UE#1, . . . . Also in the downlink radio interval, (2) HS-SCCH (High-Speed Shared Control Channel) is used as a high-speed control channel, and mobile stations UE#0 and UE#1 receives control information required for receiving packet data on HS-PDSCH. This HS-SCCH is shared by a plurality of mobile stations UE#0, UE#1 . . . . In the uplink radio channel, (3) HS-DPCCH (High-Speed Dedicated Physical Control Channel) is set for each user as a high-speed control channel for transmitting feedback information. In the HSDPA system, data retransmission control is performed between the base station BS and the mobile stations UE#0, UE#1, . . . , and the mobile stations UE#0, UE#1 . . . report ACK (acknowledgement) and NACK (not acknowledgement) depending on the decoding result of the received data to the base station BS using the above HS-DPCCH.

(A) to (D) of FIG. 17 are diagrams depicting the packet data receive mechanism of HS-PDSCH.

A transmission cycle called TTI (Transmission Time Interval=2 ms) is set on HS-SCCH, as shown in (A) of FIG. 17, and only when control information to transmit exists, this control information is transmitted from the base station BS at TTI, and is received by the mobile stations UE#0 and UE#1. The control data to be transmitted via HS-SCCH is, for example, a user identifier (UEID: User Equipment Identifier) and various parameters (e.g. spreading code, modulation scheme, data length) required for receiving data of HS-PDSCH.

The mobile stations UE#0 and UE#1 can receive HS-SCCH data at all the TTIs. For example, at slot #1 in (B) of FIG. 17, UE#0 and UE#1 receive HS-SCCH data simultaneously. Here mobile station UE#0 and UE#1 refer to the UEID in the data, and compares it with their own ID. In this case, the UEID of the HS-SCCH data in slot #1 is UE#1, so the mobile station UE#0 discards the received HS-SCCH data, and the mobile station UE#1 holds the control data in the received HS-SCCH data. Then the mobile station UE#1 extracts the parameter for receiving HS-PDSCH from the control data, and receives the packet data on HS-PDSCH ((C) and (D) of FIG. 17).

After receiving the data, the mobile station UE#1 refers to the CRC bit included in the data and judges whether the packet was successfully decoded without block error. If the data was received without block error, the mobile station UE#1 reports ACK to the base station BS using HS-DPCCH. If there is a block error, the mobile station UE#1 reports NACK to the base station BS using HS-DPCCH. This is the same for slots #2-5, and slots. #7-8, and the mobile station UE#1 receives the packet data via HS-PDSCH of slots #1 and 4, and the mobile station UE#0 receives packet data via HS-PDSCH of slots #2-3, 5 and 7-8.

Problems of Prior Art

If the first prior art is used for the radio communication system, the base station must report the guard interval length to the mobile station. However, the guard interval length, which is a basic parameter required for performing FFT for OFDM, must be known first to receive data. Therefore a method of reporting the guard interval length is a critical issue. Also, if a plurality of mobile stations are time-multiplexed as in the case of the above radio communication system, users are frequently switched, which means that the guard interval length must be frequently switched, and the mobile stations must judge the guard interval length for each packet. As a result, in each mobile station, a processing delay becomes a problem and the circuit size increases. In the base station, on the other hand, data transmission efficiency decreases because frequent transmission of information of the guard interval length is needed, and power consumption for transmitting control information increases.

If the second prior art is used for a radio communication system, a mobile station voluntarily determines a guard interval, and knows a guard interval before demodulation, so the problem of the first prior art does not exist. However, the reliability of the reported guard interval length from the mobile station to the base station must be increased, so highly efficient encoding is required for mobile stations, which increases the processing volume and power consumption, and makes the circuit complicated. Also the base station must adhere to the guard interval length specified by the mobile station, which is not desirable in terms of system management.

If the third prior art is used, highly reliable blind detection is required, which increases the processing volume of the mobile station and the power consumption, and requires a larger circuit scale accordingly. Also if a detection error is generated, the receive characteristic deteriorates, so it is difficult to implement this prior art.

SUMMARY OF THE INVENTION

With the foregoing in view, it is an object of the present invention to provide a radio communication device and a communication method which need not frequently report a guard interval length from the base station to a mobile station in a communication system which can use a plurality of guard interval lengths.

It is another object of the present invention to provide a radio communication device and a communication method for improving the data transmission efficiency and decreasing the power consumption.

In a radio communication device for a system which have a frame structure formed by a plurality of slots with guard interval, a receive state acquisition section acquires a receive state of each mobile station, a frame format decision section decides a frame format of which guard interval length is different for each slot based on the receive state of each mobile station, a slot assignment section assigns each slot of the frame format to data for each mobile station, and a frame format reporting section reports the decided frame format to each mobile station via a reporting channel.

The receive state acquisition section acquires a delay spread as a receive state of each mobile station, and the frame format decision section (1) prepares a plurality of slot formats of which guard interval lengths are different in advance, (2) determines the distribution of the delay spread based on the delay spread of each mobile station, and (3) assigns a predetermined slot format to each slot constituting the frame according to the distribution of the delay spread to determine the frame format.

The frame format decision section judges whether it is necessary to update the decided frame format, and updates the frame format if update is necessary, and the slot assignment section assigns each slot of the frame format to each mobile station based on a delay spread of each mobile station in a cycle shorter than the update period.

The slot assignment section assigns mobile station data with small path delay with priority if the mobile station data cannot be assigned to an optimum slot due to the deviation of a delay spread distribution of the mobile station.

The slot assignment section also assigns mobile station data to a slot even if the guard interval is smaller than the path delay if the mobile station data cannot be assigned to an optimum slot due to the deviation of a delay spread distribution of the mobile station.

DESCRIPTION OF THE PREFERRED EMBODIMENTS (A) Overview of Present Invention

The present invention relates to a radio communication using a guard interval, wherein a plurality of slot formats having different guard interval lengths are available and those slot formats arrayed on a time axis in each cell or each sector constitute a frame format which is unique to the cell or sector. Then considering the delay spread of the mobile station, a slot corresponding to an optimum guard interval length is assigned to mobile station data, so as to improve throughput.

Figure 1:
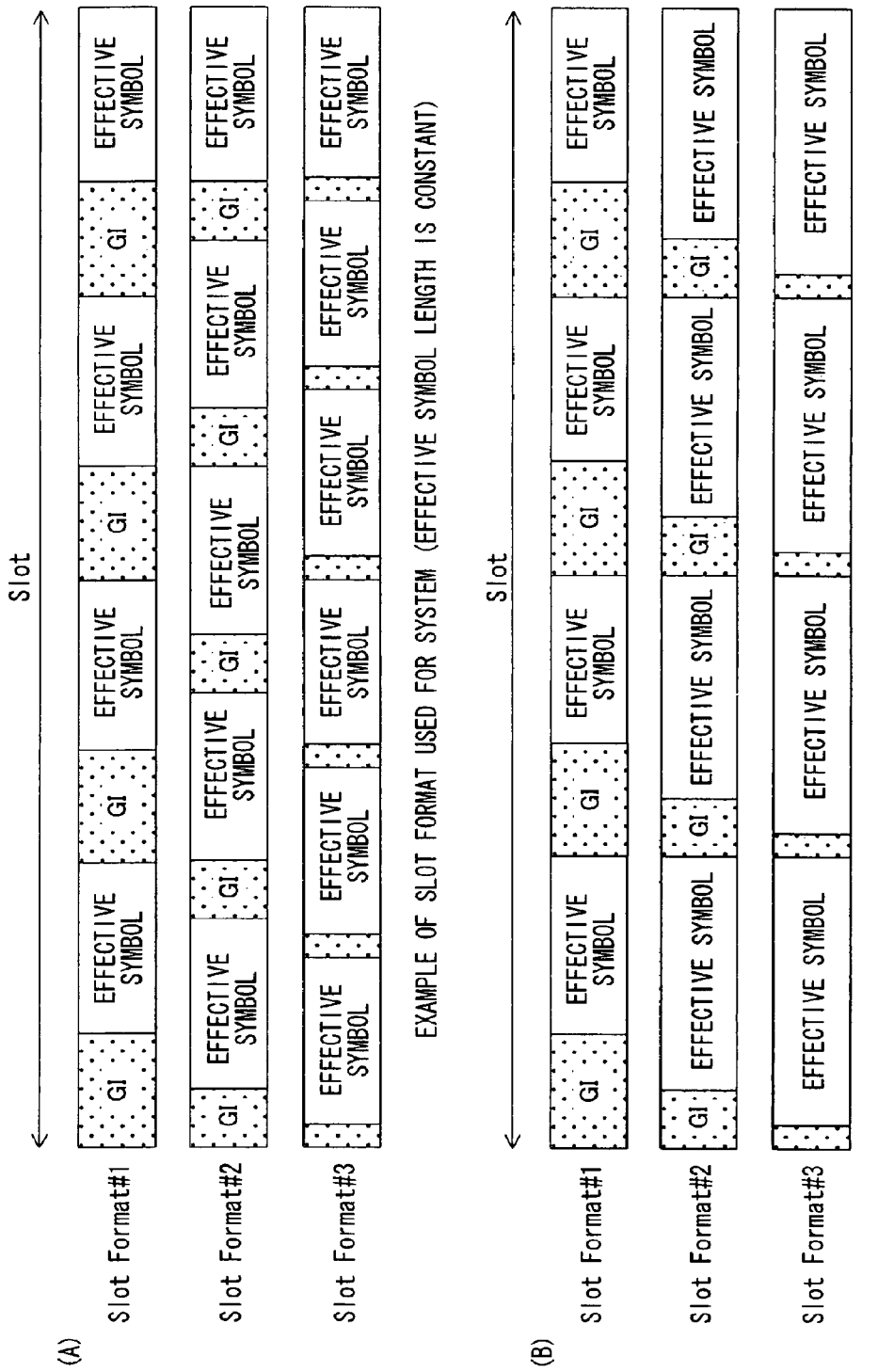
FIG. 1 are diagrams depicting the slot formats of the present invention.

FIG. 1 is a diagram depicting the slot format of the present invention. A plurality of slot formats of which guard interval lengths are different are prepared, as shown in (A) or (B) of FIG. 1. In the examples of (A) and (B) of FIG. 1, three types of slot formats, Slot Format #1-Slot Format #3, are provided, and the guard interval length becomes smaller in the sequence of Slot Format #1→Slot Format #2→Slot Format #3. The number of slot formats is not limited to three. (A) of FIG. 1 is an example in a case where an effective symbol length of each slot format, of which guard interval length is different, is constant, and (B) of FIG. 1 is an example in a case where a total length of an effective symbol and guard interval length is constant.

Figure 2:
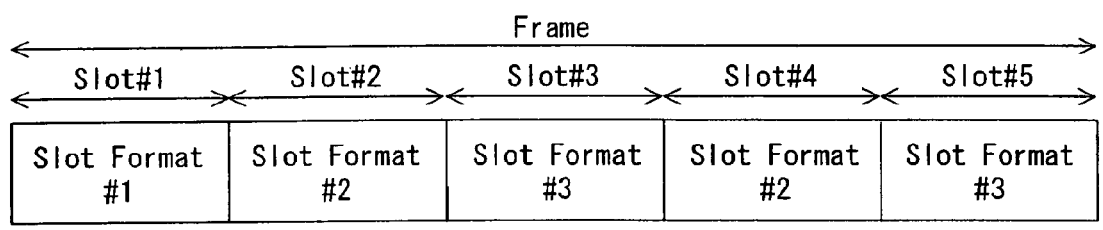
FIG. 2 is a diagram depicting a frame format of the present invention.

Each base station selects a predetermined number of slot formats out of these plurality of slot formats based on the receive state (e.g. delay spread) of the mobile station for each cell or sector which this base station covers, arrays these slot formats on the time axis, as shown in FIG. 2, and uses this as a frame format of the cell (sector). In FIG. 2, a frame consists of five slots, and Slot Format #1 of which guard interval length is the longest is assigned to the first slot (Slot #1), Slot Format #2 of which guard interval length is the second longest is assigned to the second and fourth slots (Slot #2, Slot #4), and Slot Format. #3 of which guard interval is the smallest is assigned to the third and fifth slots (Slot #3, Slot #5). This combination of frame formats is changed in a relatively long cycle, such as in a unit of several seconds.

Figure 3:
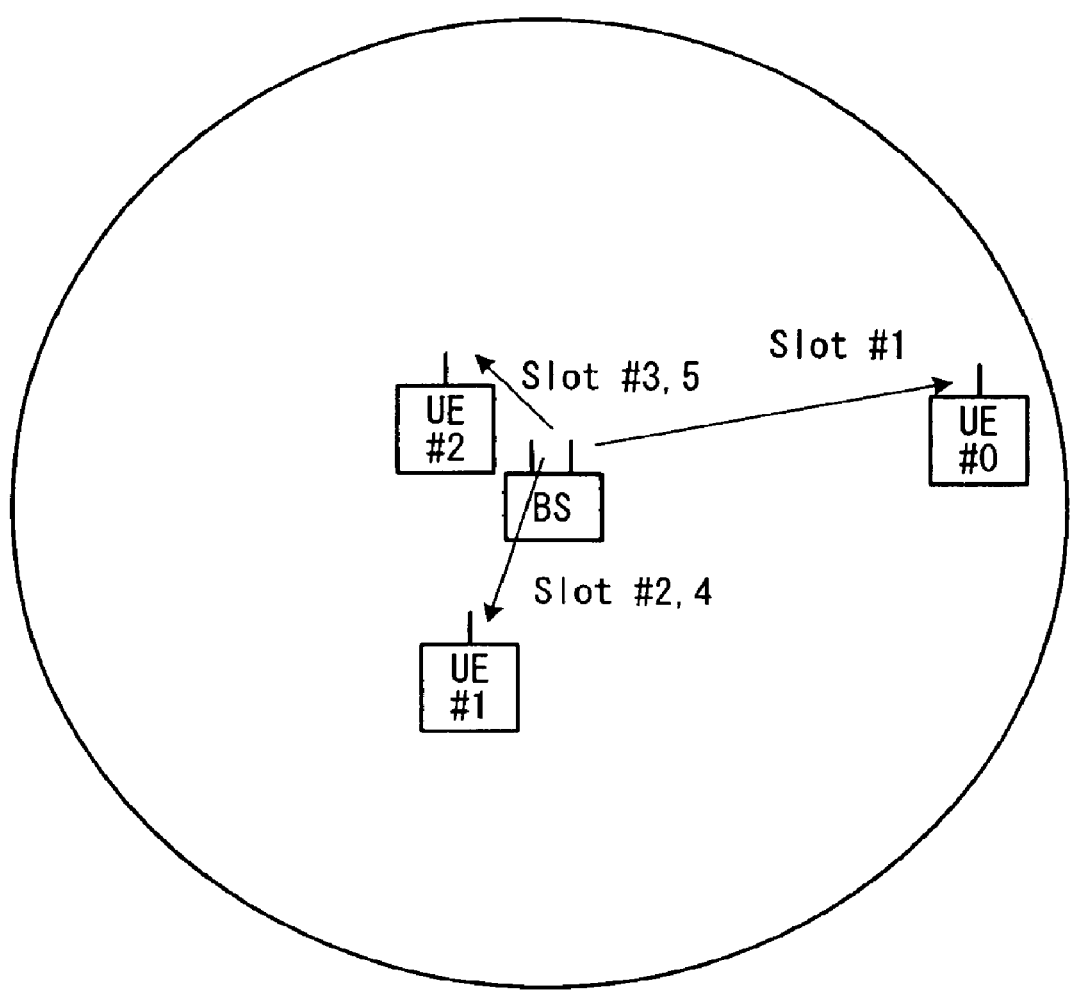
FIG. 3 is a diagram depicting an example of assigning mobile stations to each slot.

The base station also has a scheduling function to assign each slot of a frame format to a plurality of mobile stations, and controls so that data is sent to each mobile station with a slot having an optimum guard interval length considering the delay spread of the mobile station. In other words, the base station assigns data for mobile stations to each slot of the frame format so that ISI (Inter Symbol Interference) is not generated-based on the latest delay spread of the mobile station in a cycle shorter than the update cycle of the frame format, and sends the data. FIG. 3 is a diagram depicting an example of assigning each slot to a mobile station. The path delay is correlated to a distance from the base stations BS. The mobile station UE#2 is close to the base station BS and has a small path delay, and therefore can transmit with Slot Format #3, and thus Slot #3 and Slot #5 are assigned (see FIG. 2). In the same way, Slot #2 and Slot #4 are assigned to the mobile station UE#1, and Slot #1 is assigned to the mobile station UE#0. Actually, however, a slot is not decided based on the distance between the base station and the mobile station, but the path delay information (delay spread) is always used to decide the assigned slot, as mentioned later.

The base station also reports the frame format currently in use to a mobile station via a reporting channel. By this, the mobile station can know in advance which slot format is used in each slot of the reported frame format using the internal table. In other words, only by receiving the frame format each time the frame format is updated, the mobile station can identify the slot format of each slot, and can perform demodulation and decoding processing, with deleting the guard interval, based on this slot format.

The delay spread of a mobile station can be known by a delay spread report data from the mobile station, or by detecting an uplink receive state from the mobile station. In an example of the former case, the mobile station estimates the delay spread based on the downlink signal from the base station, quantizes this delay spread, and reports it to the base station. In an example of the latter case, the base station estimates the delay spread of each mobile station based on the uplink signal of each mobile station using the internal delay spread estimation section.

According to the present invention, it is unnecessary to transmit/receive the guard interval length information frequently, transmission with a semi-optimum guard interval length becomes possible, and throughput can be improved.

(B) Base Station

Figure 4:
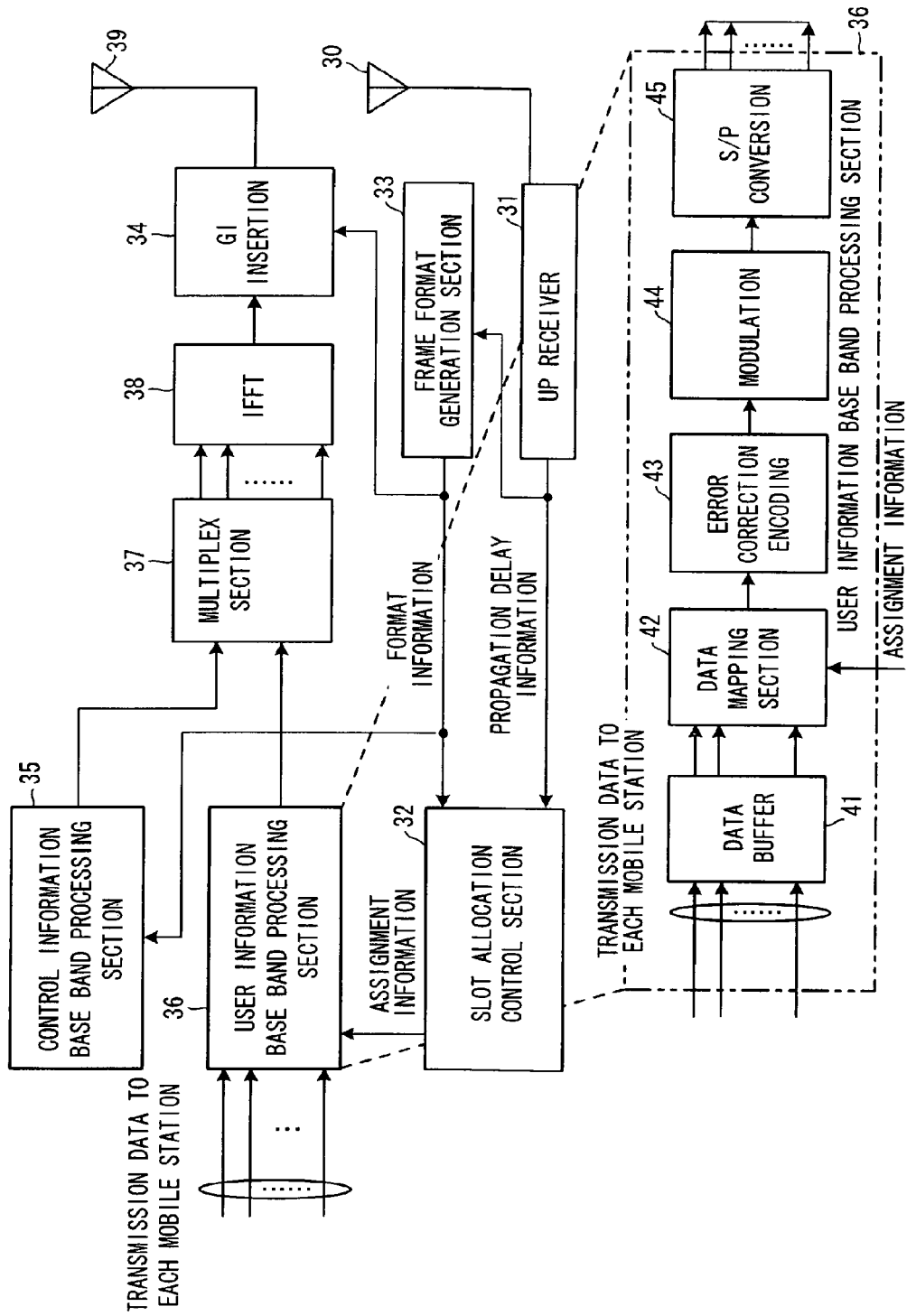
FIG. 4 is a block diagram depicting a base station of the present invention.

FIG. 4 is a block diagram depicting a base station of the present invention. An antenna 30 receives uplink data which is sent from each mobile station and inputs it to an uplink receiver 31, and the uplink receiver 31, as a receive state acquisition section, demodulates propagation delay information (delay spread) of each mobile station by the receive signal, and inputs the propagation delay information to a slot assignment control section 32 and a frame format generation section 33. The frame format generation section 33 prepares a plurality of slot formats of which guard interval lengths are different in advance, as shown in (A) and (B) of FIG. 1, determines a distribution of the delay spread in a predetermined cycle based on the delay spread of each mobile station, assigns a predetermined slot format to each slot constituting the frame according to the distribution of the delay spread, decides a frame format by this (see FIG. 2), and inputs this frame format to the slot assignment control section 32, a guard interval insertion section 34 and a control information base band processing section 35.

The control information base band processing section 35 maps the reported frame format information to the reporting channel, multiplexes it with a user data, and reports the frame format information to all the mobile stations in a cell or a sector.

The slot assignment control section 32 assigns each slot of the decided frame format to data for each mobile station based on the latest delay spread of the mobile station in a cycle shorter than a frame format update cycle, and inputs the assignment information to a data mapping section 42 of a user information base band processing section 36.

In the user information base band processing section 36, a data buffer 41 stores data which is sent to a plurality of mobile stations, the data mapping section 42 extracts data for each mobile station sequentially from the first slot in order based on the assignment information which is input from the slot assignment control section 32, and outputs the data in serial. An error encoding section 43 encodes the data for a mobile station, using convolutional codes or turbo-codes, for example, and a modulation section 44 modulates the encoded data by BPSK, QPSK or 16-QAM, for example, after interleave. Then a serial/parallel converter (S/P converter) 45 converts modulation data symbols into N symbols of parallel data strings and generates N number of sub-carrier components. The slot format has a constant effective symbol length (=N), as shown in (A) of FIG. 1.

A multiplex section 37 multiplexes data which is input from the user information base band processing section 36 and the control information base band processing section 35 by code division multiplex, for example, and outputs the multiplexed data. An N point inverted fast Fourier transform section 38 performs inverted fast Fourier transform (IFFT) on N number of sub-carrier components which are output from the multiplex section 37, converts N number of time signal components in serial, and outputs them as an OFDM symbol. The guard interval insertion-section 34 determines the guard interval length of each slot based on the frame format reported by the frame format generation section 33, inserts a guard interval GI having this length into the OFDM symbol which was input, and sends it to the space by an antenna 39 via a digital/analog converter (D/A) and a radio section, which are not illustrated.

As mentioned above, the slot assignment control section 32 assigns each slot of the frame format to the data for a mobile station based on the latest delay spread of the mobile station in a cycle shorter than the frame format update cycle. Therefore there is a probability that an optimum slot may not be able to be assigned to a mobile station due to the deviation of the delay spread distribution of mobile stations generated after the frame format is decided. In such a case, a slot is assigned to a mobile station with small path delay with priority using a method to be mentioned later. Also the slot assignment control is executed considering throughput of the entire system, so that transmission is possible depending on the situation even if the guard interval is smaller than the path delay.

The distribution of a mobile station and delay path environment of a cell change depending on time. Therefore it is preferable that the frame format which is unique to the cell or sector can be updated in a relatively long cycle. For example, the distribution of the delay spread of each mobile station is statistically monitored by the base station, and the frame format is changed accordingly. In other words, the frame format generation section 33 judges whether it is necessary to update the frame format based on the delay spread of each mobile station, and updates the frame format only when update is necessary.

(C) Mobile Station

Figure 5:
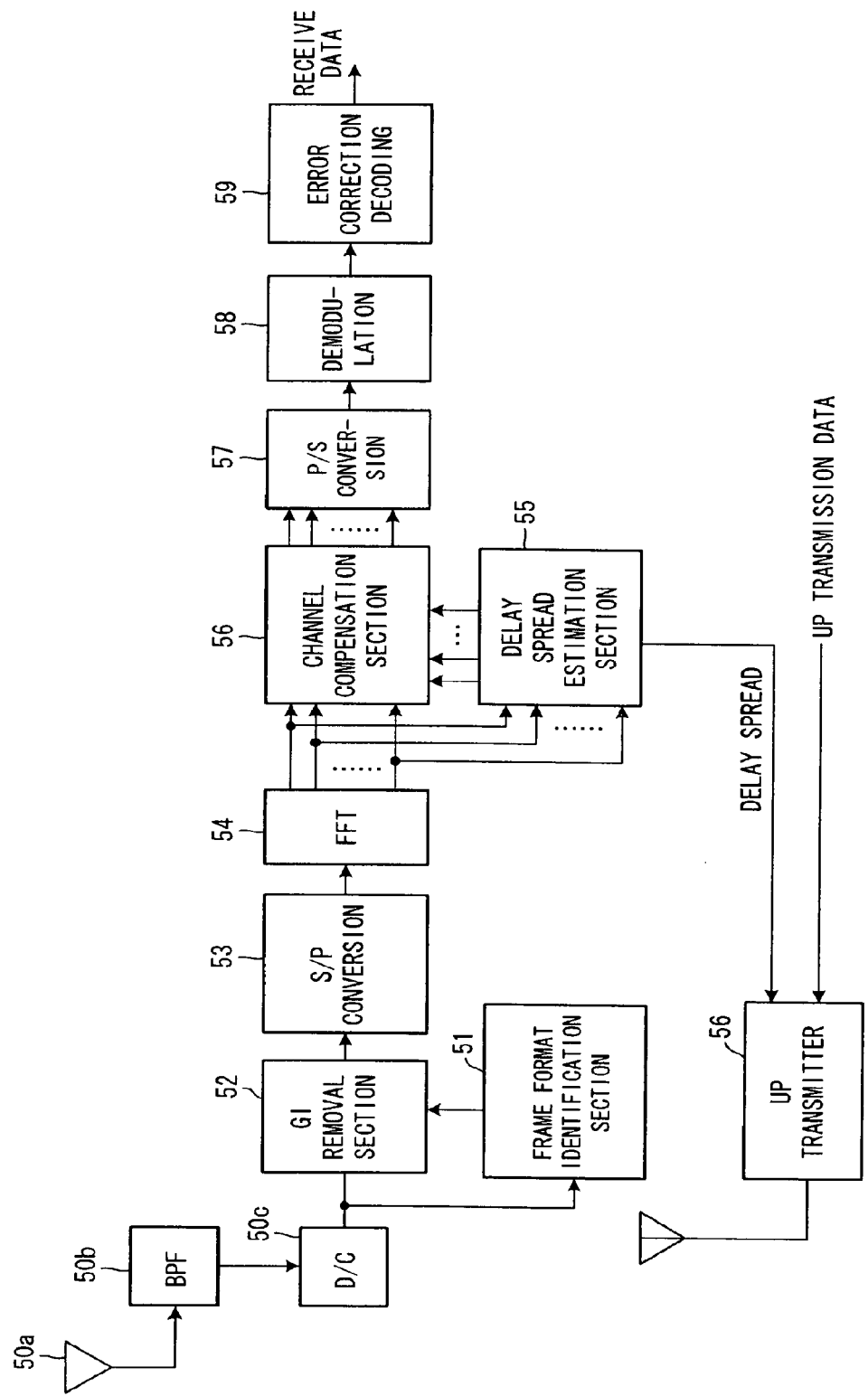
FIG. 5 is a block diagram depicting a mobile station of the present invention.

FIG. 5 is a block diagram of a mobile station of the present invention. A band pass filter 50b performs filtering on signals received by an antenna 50a and removes unnecessary frequency components, a down converter (D/C) 50c converts a radio signal into base band frequency, and an analog/digital converter (not illustrated) converts a base band signal from analog into digital, and inputs it to a frame format identification section 51 and a GI removal section 52. The frame format identification section 51 extracts and recognizes the frame format information which is sent via a control channel, and inputs it to the GI removal section 52. The GI removal section 52 identifies the guard interval length of each slot constituting the frame based on the reported frame format information, removes the guard interval for each slot, and outputs the N symbols of an OFDM symbol. An S/P converter 53 converts the signal after the guard interval is removed into N number of parallel data, and inputs it to N points of the Fourier transform section 54. The Fourier transform section 54 performs N points of FFT processing on N number of time signal components, and outputs N number of sub-carrier components.

A channel estimation section formed in a delay spread estimation section 55 performs a known channel estimation operation, estimates a channel of each sub-carrier, and inputs a channel compensation value to a channel compensation section 56. The channel compensation section 56 multiplies N number of FFT processing results by a channel compensation value for channel compensation, and a P/S converter 57 sequentially outputs channel-compensated N number of sub-carrier components in serial, and a demodulation section 58 demodulates an input signal using BPSK, QPSK, or 16-QAM, for example, and a decoding section 59 decodes the input data for error correction after deinterleave, and outputs the result. The delay spread estimation section 55 estimates a delay spread, and an uplink transmitter 56 transmits this delay spread to the base station.

Figure 6:
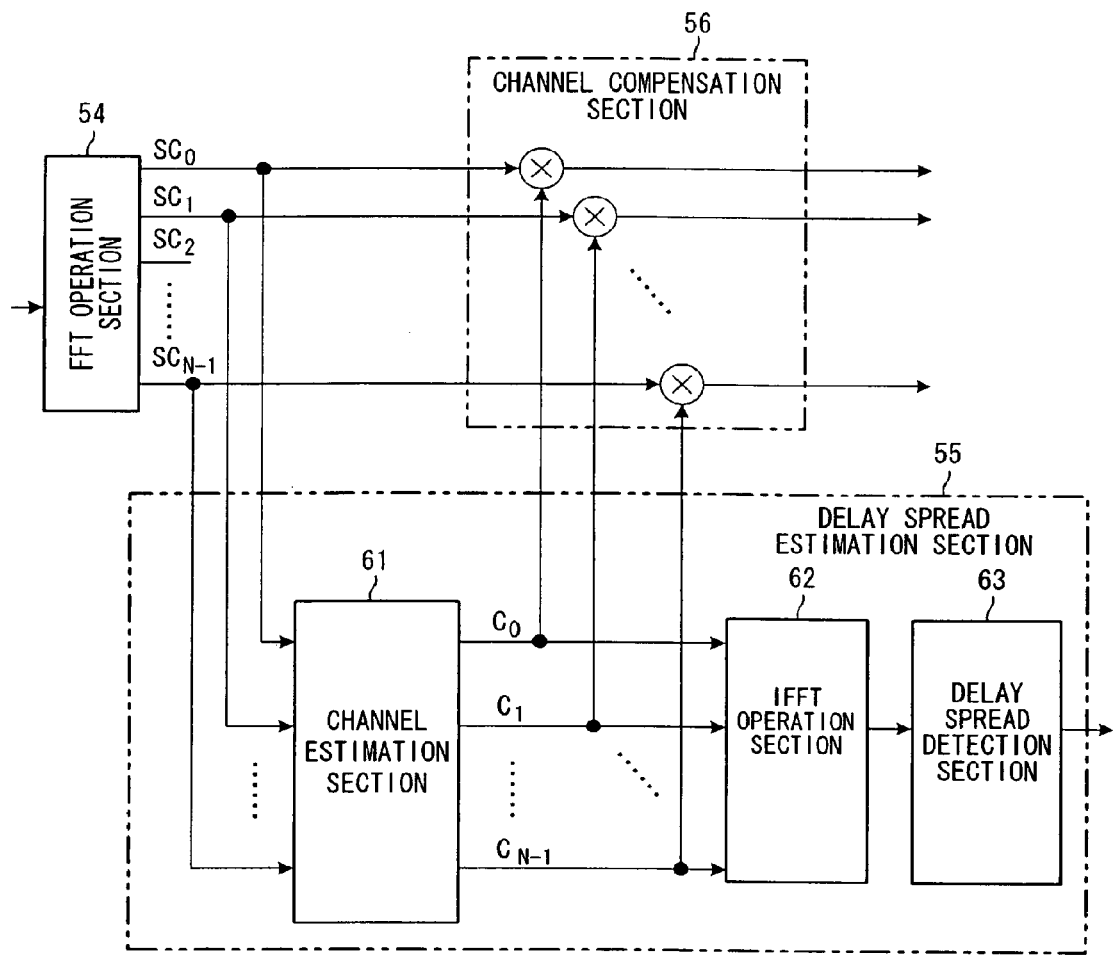
FIG. 6 is a block diagram depicting a delay spread estimation section.

FIG. 6 is a block diagram of the delay spread estimation section 55. The FFT 54 performs FFT operation processing on OFDM symbol data, and converts it into the number sub-carriers N of signals $SC_O$-$SC_{N-1}$. A channel estimation section 61 of the delay spread estimation section 55 performs channel estimation for each sub-carrier using a pilot multiplexed at the transmission side, and outputs channel estimation values $C_0$-$C_{N-1}$. In other words, the channel estimation section 61 estimates an amplitude and a phase of each sub-carrier due to fading channel shown by $A_n \exp(j_n\phi)$ (n=1–N) using a pilot signal, and outputs channel compensation values $(1/A_n) \exp(-j_n\phi)$ (n=1–N). Each multiplier of the channel compensation section 56 multiplies the sub-carrier signal of the transmission symbol by $(1/A_n) \exp(-j\phi)$ so as to compensate the fading.

Figure 7:
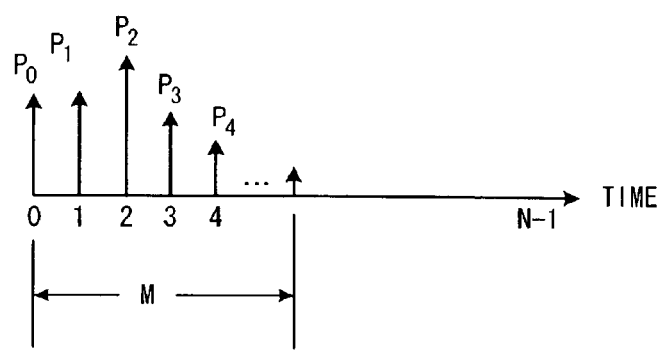
FIG. 7 is a diagram depicting a delay profile and delay spread.

An IFFT operation section 62 performs IFFT operation on the number of sub-carriers N of channel estimation values $C_0$-$C_{N-1}$ which are output from the channel estimation section 61, and outputs a delay profile which consists of N number of samples per one OFDM symbol period shown in FIG. 7. Each sample value indicates the intensity of the received wave (direct wave, delay wave) in each path of the multi-paths, and after the delay time M from the FFT window position (=0), each sample value of the delay profile becomes a small value less than the set level. A delay spread detection section 63 detects this delay time M as a delay spread, and outputs it. The delay spread indicates a spread of the multi-paths, and can be used for judging the good/bad receive state of a mobile station. If the delay spread is large, the maximum delay time is large and the receive state is bad, and if the delay spread is small, the maximum delay time is small and the receive state is good.

The above is the case when the mobile station measures the delay spread, and transmits it to the base station, but the base station side can also measure the delay spread of each mobile station. In other words, in a case when the frequency bands of the downlink and uplink are the same or not so different, and it is expected that the delay characteristics of the path are approximately the same in the uplink and downlink, the delay spread estimation section shown in FIG. 6 is installed in the base station.

(D) Variant Form of Base Station

Figure 8:
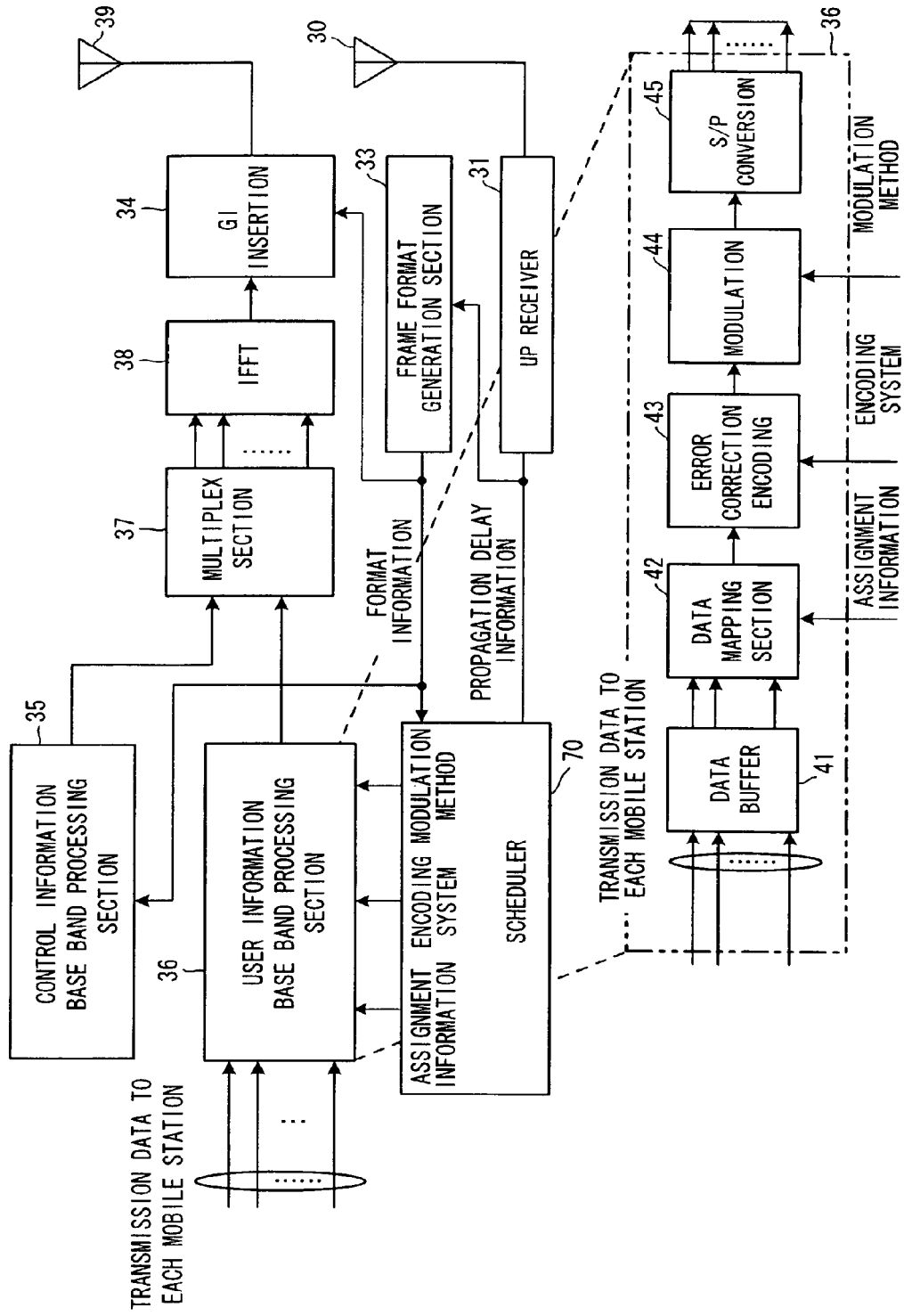
FIG. 8 is a block diagram depicting a base station when the slot assignment control section is replaced with a scheduler section.

As shown in FIG. 8, the slot assignment control section 32 may be replaced with a scheduler section 70. In this case, in the scheduler section 70, a destination mobile station to which a data packet is transmitted via a predetermined slot, and an encoding scheme and modulation method thereof, are decided, and error correction encoding, data modulation and OFDM modulation are performed accordingly, and the data packet is transmitted as OFDM symbol after a guard interval with a predetermined length is inserted. At this time, the scheduler section 70 does not have to decide the guard interval length. The mobile station, to which a frame format has been reported via a common control channel, knows the guard interval length in each slot in advance, so the guard interval is deleted and FFT processing using this information is performed in the mobile station.

(E) Frame Format Generation Method and Slot Assignment Method

Now a frame format generation method and a slot assignment method will be described. In the following description, it is assumed that the number of users≦the number of slots in a frame ($N_{slot}$), so as to simplify the description, but if the slot assignment control section 32 is replaced with the scheduler section 70, as shown in FIG. 8, this method can also be used for the case of number of users>$N_{slot}$. In other words, if slot assignment is performed combining with schedule control (priority assignment control based on reception quality of each user), the method can be also used for the case of number of user>$N_{slot}$.

(a) Definition of Frame Format

It is assumed that the number of slots in a frame $N_{slot}$, number of slot formats K, and guard interval GI length in slot format #k (1≦k≦K) $T_k$ have been uniquely defined in the system in advance. To make it easier for the user to assign slots, the slot format #1~#k is defined in the sequence of the guard interval length ($T_1 > T_2 > \ldots > T_K$), and the slots are lined up for $N_k$ number of slots (0≦$N_k$≦$N_{slot}$) at a time in the sequence of the lower number in k, so as to form one frame format. Here $N_k$ is the number of slots in a frame having a slot format #k of which GI length is $T_k$, and is decided according to the distribution of the delay spread, as mentioned later.

Figure 9:
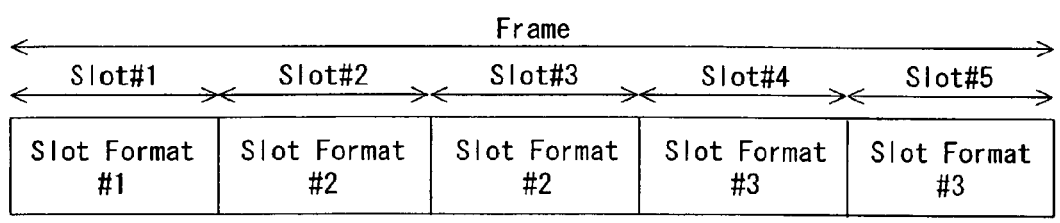
FIG. 9 is a diagram depicting an example of a frame format when $N_{slot}=5$, $K=3$, $N_1=1$, $N_2=N_3=2$.

FIG. 9 shows an example of a frame format when $N_{slot}$=5, K=3, $N_1$=1, $N_2$=$N_3$=2. The $N_{slot}$, K and $T_k$ are uniquely defined in the system, so the frame format can be reported to the mobile station (user) by reporting only $N_k$ for all the slot formats #1~#k.

(b) Frame Format Generation Method

Figure 10:
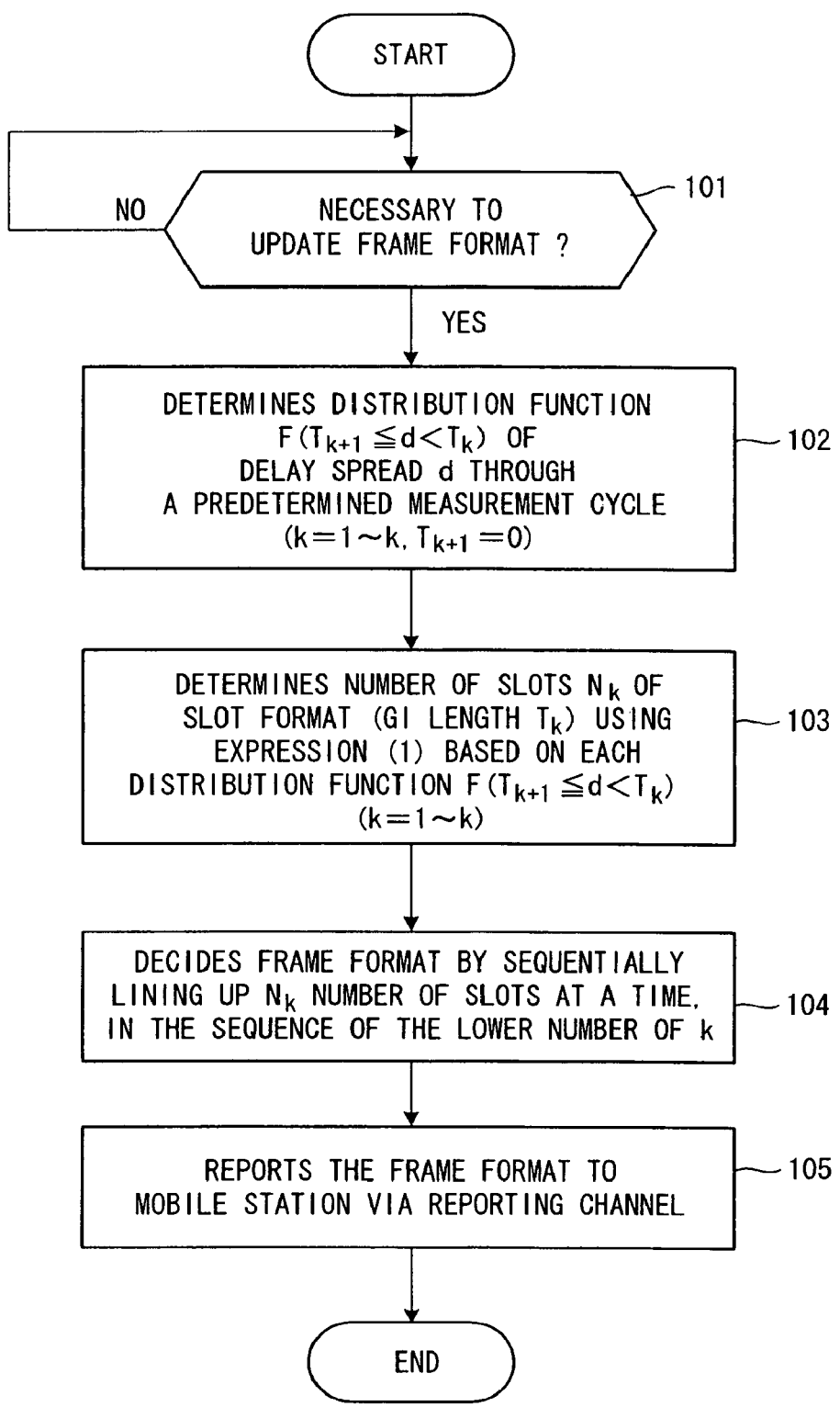
FIG. 10 is a flow chart depicting a frame format generation processing.

FIG. 10 is a flow chart depicting the frame format generation processing of the frame format generation section 33.

The frame format generation section 33 monitors whether it is necessary to update the frame format (step 101). For the frame format update timing, (1) in the case of a method of updating periodically, the frame format is updated in this update cycle, and (2), in the case of updating considering the receive environment, the frame format generation section 33 determines the latest delay spread distribution, compares it with the delay spread distribution at a previous frame format update, judges whether an update of the frame format is necessary, and updates it if update is necessary. In this description, it is assumed that the frame format is updated periodically.

If update is necessary, the frame format generation section 33 performs statistics processing for the propagation delay information (delay spread) of each user which is input from the uplink receiver 31, and determines the distribution function $F(T_{k+1} \leq d < T_k)$ of the delay spread d ($T_{k+1} \leq d < T_k$) throughout a predetermined measurement cycle (step 102). Here k=1~K, $T_1 > T_2 > \ldots > T_K > T_{K+1}$ (=0).

In this case, the distribution function $F(T_{k+1} \leq d < T_k)$ indicates a ratio of users of which delay spread d is in the range of $T_{k+1} \leq d < T_k$. The measurement cycle is set to a relatively long cycle so as to follow up the slow change of the delay path environment.

The frame format generation section 33 calculates the number of slots $N_k$(k=1–K) of a slot format #k in a frame of which GI length is $T_k$ using the following expression, based on the distribution function $F(T_{k+1} \leq d < T_k)$ determined in step 102 (step 103).

$$N_K = [F(0 \leq d < T_K) \times N_{slot}] \quad (1)$$
$$N_{K-1} = [F(T_K \leq d < T_{K-1}) \times N_{slot}]$$
$$\ldots$$
$$N_2 = [F(T_3 \leq d < T_2) \times N_{slot}]$$
$$N_1 = N_{slot} - \sum_{k=2}^{K} N_k$$

In equation (1) [x] indicates a maximum integer which does not exceed x.

Then the frame format generation section 33 arranges $N_k$ number of slots which is in proportion to the distribution function $F(T_{k+1} \leq d < T_k)$ sequentially from the slot format #k with smaller GI length (k=K, K−1 ... 1), and arranges finally $N_1$ number of slots for the slot format #1 of which GI length is the maximum, so as to generate the frame format (step 104). As being obvious from the equation, the accumulated value of the fractions which are rounded off by [·] is inserted to $N_1$, thereby the slot format of which GI length is longest are assigned with priority.

For example, in the case of $N_{slot}$=5, K=3, F (0≦d<$T_3$)=20%, F ($T_3$≦d<$T_2$)=30%, and F(d≧$T_2$)=50%, $N_1$-$N_3$ are calculated as follows.

$$N_3 = [0.2 \times 5] = 1$$
$$N_2 = [0.3 \times 5] = 1$$
$$N_1 = 5 - 2 = 3 \quad (2)$$

The frame format generation section 33 inputs the generated frame format to the slot assignment control section 32, guard interval insertion section 34, and control information base band processing section 35. The control information base band processing section 35 reports the number of slots $N_k$ (k=1~K) having a slot format #k with GI length $T_k$ in the reported frame format to all the mobile stations in the cell or sector via an information channel (step 105), and ends the frame format generation processing.

(c) Slot Assignment Method

The slot assignment control section 32 (FIG. 1) assigns each slot constituting the frame format generated by the frame format generation section 33 to each mobile station (user) according to the following procedure.

(1) The users are rearranged sequentially from a user having the longest delay spread d.
(2) A slot is assigned sequentially to the rearranged users, from a slot of the lower slot format #k having the longer GI length. If the distribution of the number of slots $N_k$(k=1~N) and the user distribution based on the delay spread match, a slot having GI length closest to the delay spread, out of the GI lengths that satisfy delay spread<GI length, can be assigned to each user.
(3) Even if the distribution of the number of slot $N_k$(k=1~N) and the user distribution based on the delay spread do not match and delay spread is larger GI length in procedure (2), assignment is continued according to the sequence of the users after the rearrangement.
(4) If all the users with d≧$T_{k+1}$ have been assigned to the slots of the GI length $T_k$ (>$T_{k+1}$) and some such slots remain unassigned, the slots are assigned sequentially to the remaining users with d<$T_{k+1}$ in ascending order of the delay spread.

Figure 11:
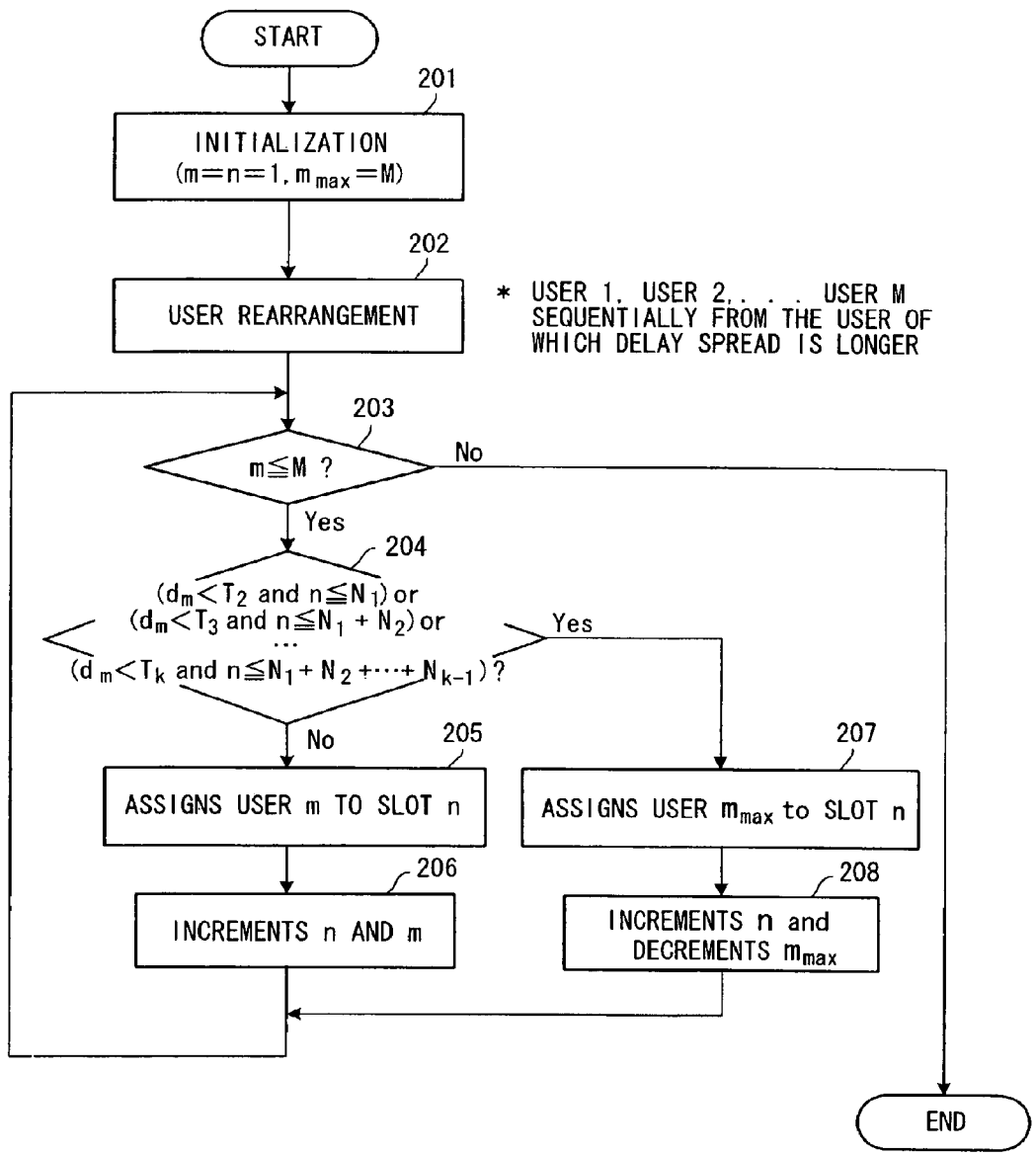
FIG. 11 is a flow chart depicting a slot assignment processing.

FIG. 11 is a flow chart depicting the slot assignment processing for implementing the above operation.

Here the judgment of whether an empty slot with GI length $T_k$ exists in the above (4) corresponds to the judgment whether "$d_m$<$T_{k+1}$ and n≦$N_1$+$N_2$+ ... +$N_k$ (1≦k≦K) are satisfied in step 204.

When slot assignment starts, the slot assignment control section 32 initializes to m=n=1, $m_{max}$=M (step 201). Here m indicates that the target user is the m-th user, and n−1 is the number of slots assigned thus far, and M is the total number of users.

Then the users are rearranged sequentially from a user having a longer delay spread (step 202), and it is checked whether m≦M (step 203) and the procedure ends if m=M+1. If m≦M, it is checked whether $d_m$<$T_{k+1}$ and n≦$N_1$+$N_2$+...+$N_k$(1≦k≦K) (step 204) are satisfied. In other words, the range of the delay spread $d_m$ of the m-th user is determined as $d_m$<$T_{k+1}$, and it is judged whether n≦$N_1$+$N_2$+ ... +$N_k$ is satisfied. If the condition in step 204 is not satisfied, the m-th user is assigned to the n-th slot of the frame format (step 205), n and m are incremented (step 206), and processing returns to step 203.

If the condition in step 204 is satisfied and some slots with GI length $T_k$ remain unassigned, so the $m_{max}$-th user is assigned to slot n (step 207), n is incremented, and $m_{max}$ is decremented (step 208), and processing returns to steps 203.

Now the slot assignment control will be described using the operation examples shown in (A) and (B) of FIG. 12. Here it is assumed that the number of slots $N_{slot}$=5, the number of slot formats K=3, and the number of users M=5. Also in the user numbers after rearrangement, it is assumed that (1) the delay spreads of user 1 and user 2 are in the $T_2$≦d<$T_1$ range, (2) the delay spread of user 3 is in the $T_3$≦d<$T_2$ range, and (3) the delay spreads of user 4 and user 5 are in the 0≦d<$T_3$ range.

Figure 12:
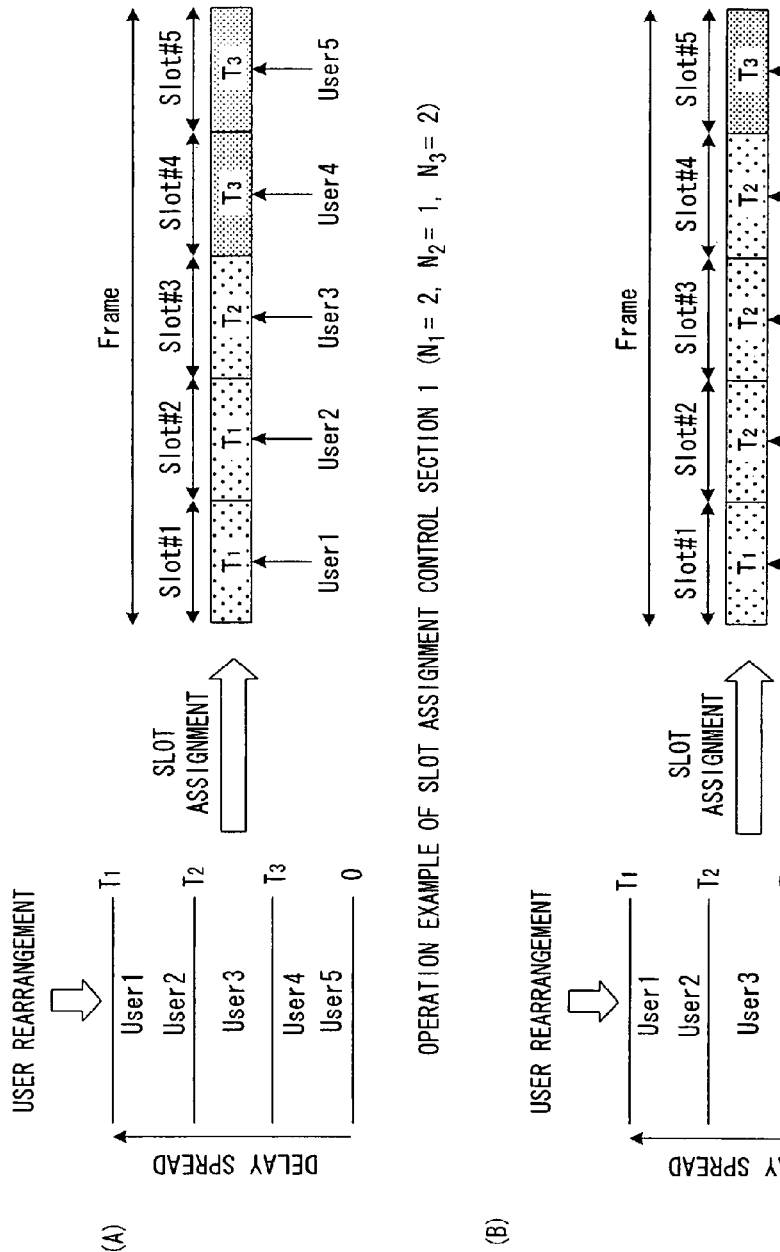
FIG. 12 are diagrams depicting operation examples of the slot assignment control.
Figure 13:
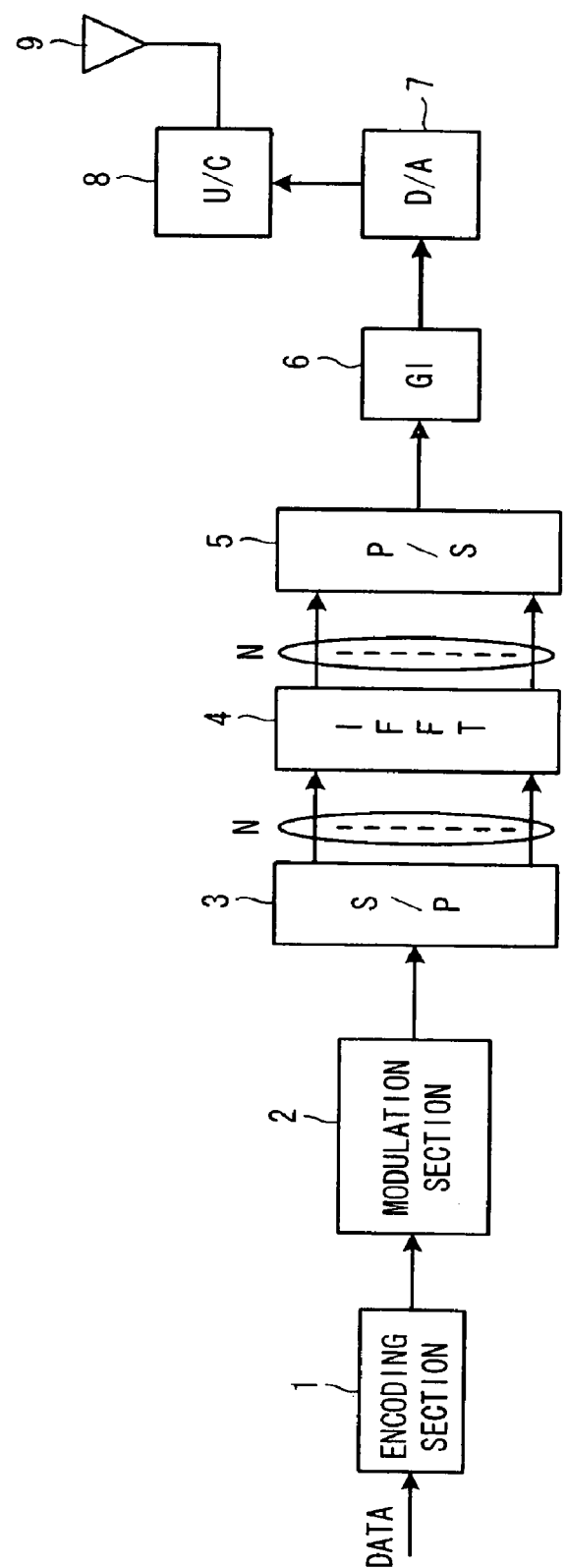
FIG. 13 is a block diagram depicting an OFDM transmitter in a conventional OFDM radio communication system.
Figure 14:
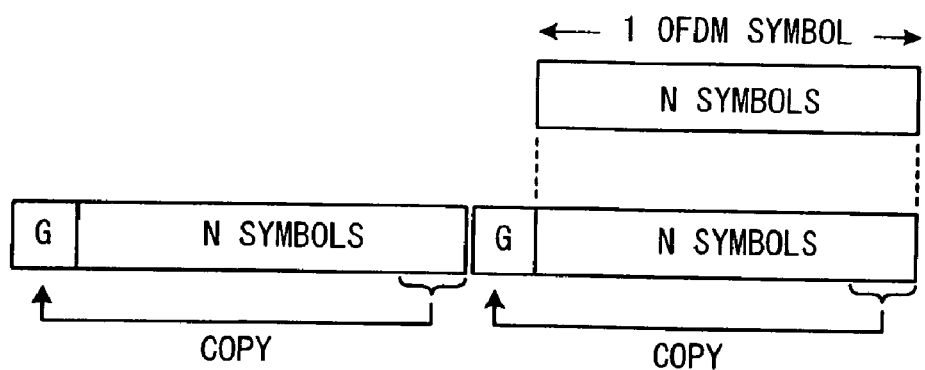
FIG. 14 is a diagram depicting a guard interval insertion.
Figure 15:
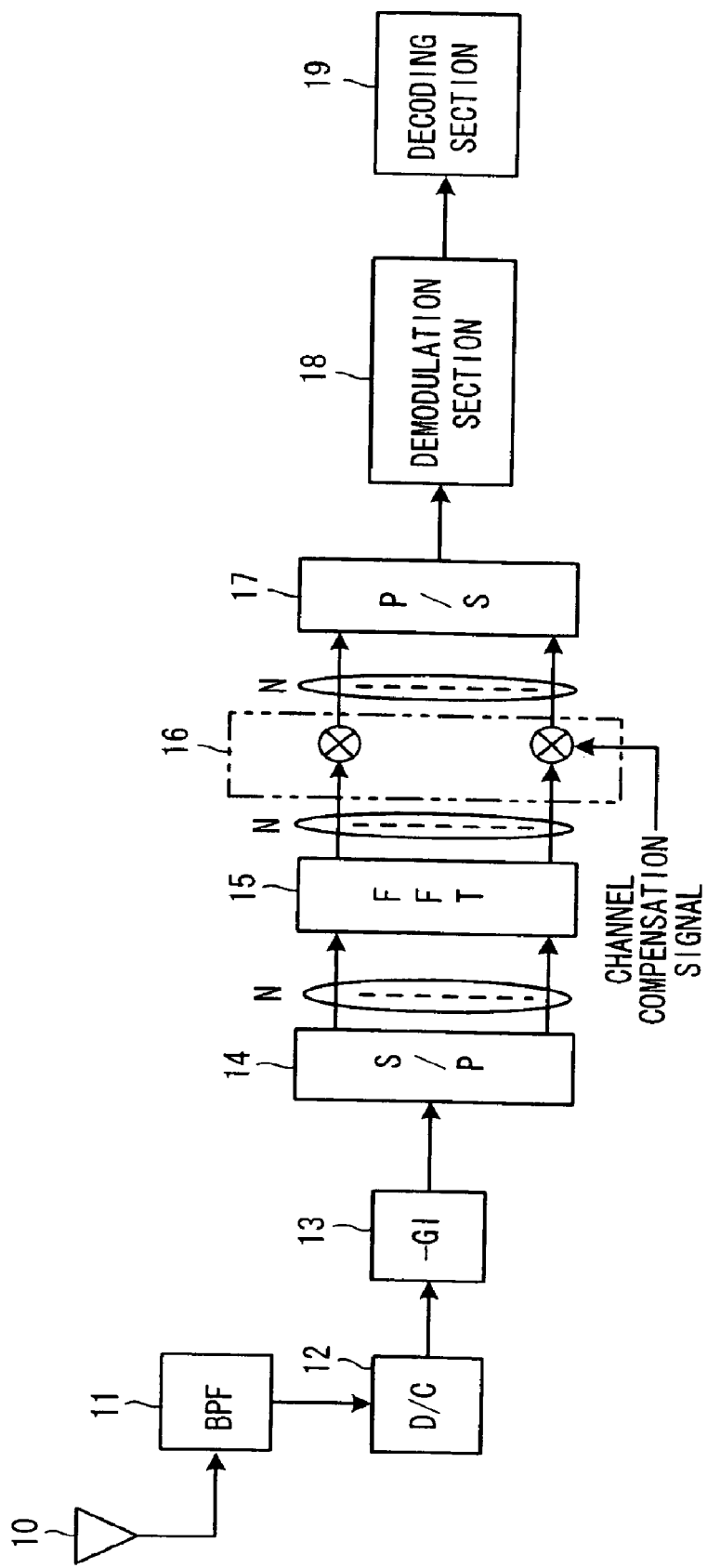
FIG. 15 is a block diagram depicting an OFDM receiver in the OFDM radio communication system.
Figure 16:
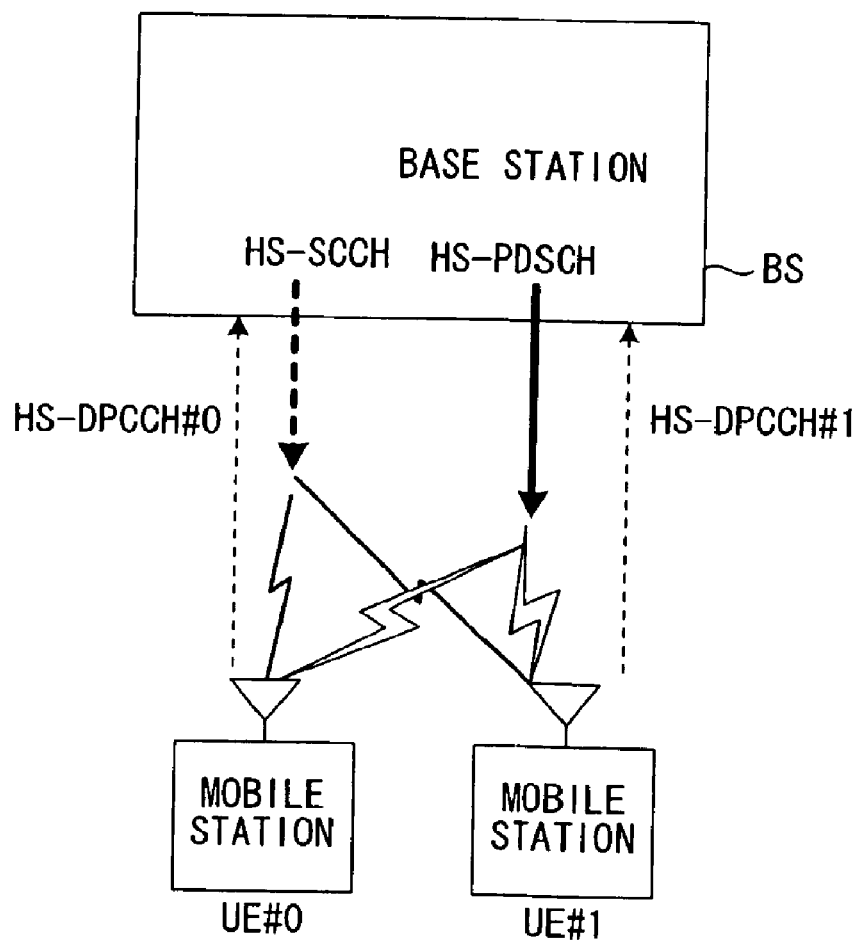
FIG. 16 is a diagram depicting a channel of the HSDPA system.
Figure 17:
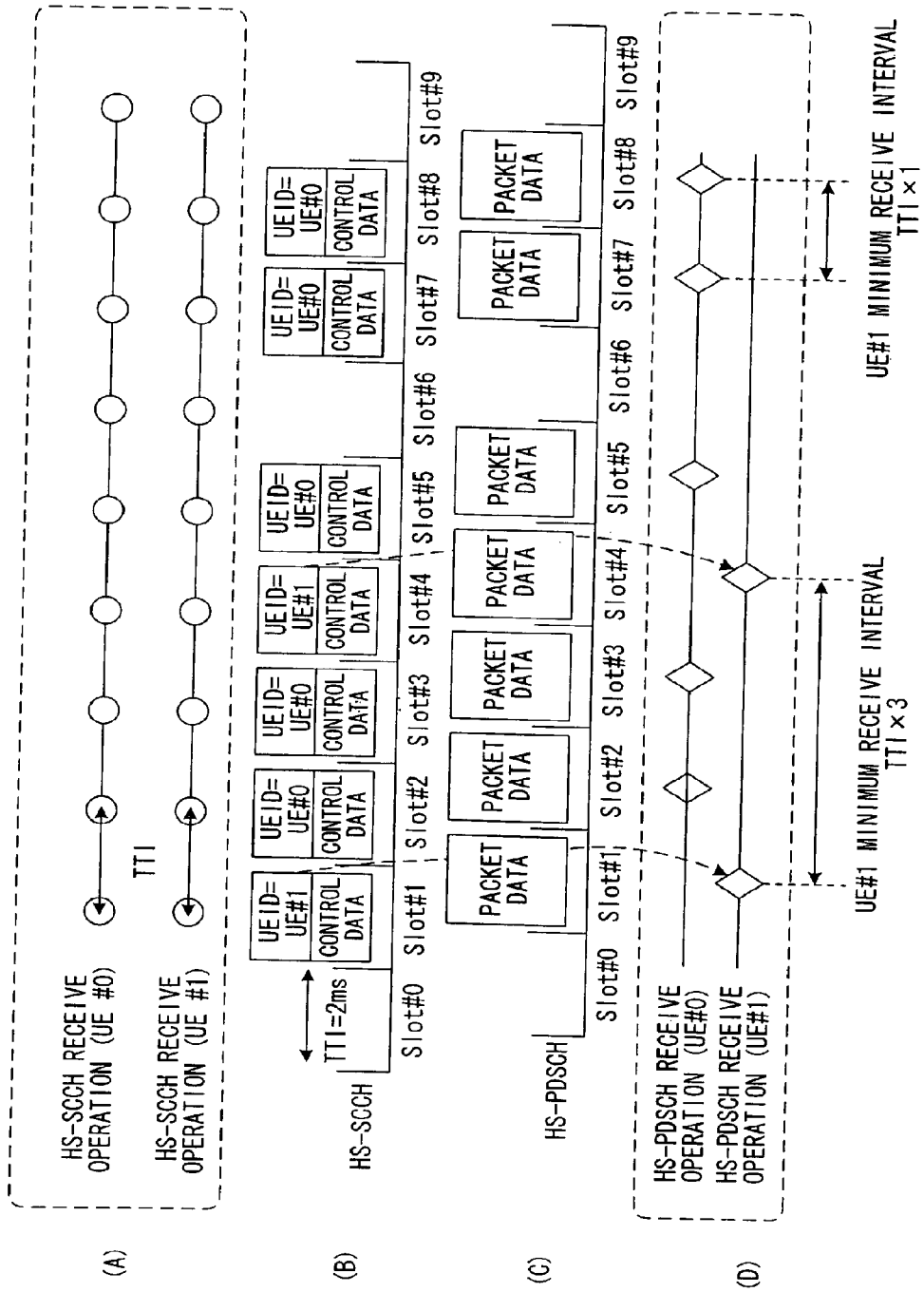
FIG. 17 are diagrams depicting a receive mechanism of a packet data on HS-PDSCH.

If the distribution of $N_k$ ($N_1$=2, $N_2$=1, $N_3$=2) generated by the frame format generation section 33 matches the above mentioned user distribution of the delay spread, each slot of the frame format can be accurately assigned to the users, as shown in (A) of FIG. 12, and actual distribution also becomes $N_1$=2, $N_2$=1 and $N_3$=2.

However if the update of the frame format has not followed up the change of the delay spread distribution, and if the distribution of $N_k$ does not match the actual user distribution of the delay spread due to a rounding error generated by round down when $N_k$ of the frame format is calculated, each slot of the frame format cannot be accurately assigned to the users.

Now an operation example in the case of matching and an operation example in the case of a mismatch will be described.

Operation example 1 (see (A) of FIG. 12): When the distribution of $N_k$ ($N_1$=2, $N_2$=1, $N_3$=2) in the frame format and the user distribution ($N_1$=2, $N_2$=1, $N_3$=2) of the delay spread match, the conditions in step 204 are not established for all users, so in the processing in steps 205 and 206, slots are assigned from the first one sequentially to the user of which delay spread is longer. As a result, user 1 and user 2 are assigned to the slots with guard interval length $T_1$, user 3 is assigned to the slot with $T_2$, and user 4 and user 5 are assigned to the slots with $T_3$.

Operation example 2 (see (B) of FIG. 12): In the case where the distribution of $N_k$ ($N_1$=1, $N_2$=3, $N_3$=1) in the frame format and user distribution ($N_1$=2, $N_2$=1, $N_3$=2) of the delay spread do not match, since the delay spread $d_1$ of the user 1 is in a range of $T_2$≦$d_1$<$T_1$ the conditions in step 204 is satisfied, so the user 1 is assigned to slot 1 ($T_1$ slot) in the procedure in step 205.

Like the user 1, since the delay spread of the user 2 is $T_2 \leq d_2 < T_1$, also the conditions in step 204, so is assigned to slot 2 ($T_2$ slot) in the processing in step 204 is not satisfied, so the user 2. In this case, assignment to the $T_1$ slot is desirable but the $T_1$ empty slot is not, so user 2 is assigned to the $T_2$ slot.

Unlike the user 2, the delay spread of the user 3 is in arrange of $T_3 \leq d_3 < T_2$ but n=3>$N_1$ is established, and also the conditions in step 204 is not satisfied, so the user 3 is assigned to slot 3 ($T_2$ slot) in the processing in step 205.

In regard to user 4, since the delay spread is in a range of $T_4(=0) \leq d_4 < T_3$ and n=4=$N_1+N_2$, the conditions in step 204 is satisfied, so user 5, of which delay spread is smallest, is assigned to slot 4 ($T_2$ slot) in the processing in step 207.

Thereafter, since m is not incremented in the former processing, so the judgment in step 204 is performed again for user 4. This time, $T_4(=0) \leq d_4 < T_3$ and n=5>$N_1+N_2$ is established and the conditions in step 204 is not satisfied, so user 4 is assigned to slot 5 ($T_3$ slot) in the processing in step 205.

According to the present invention, transmission with a semi-optimum guard interval length becomes possible without transmitting/receiving the guard interval length information frequently, and throughput can be improved.

Also according to the present invention, slot assignment can be continued even in the case when the frame format no longer matches the actual receive state.

What is claimed is:

1. A radio communication apparatus for forming a frame with a plurality of slots, and inserting a guard interval into each slot along with data for a mobile station to perform communication, comprising:
   a receive state acquisition section for acquiring a receive state of each mobile station;
   a frame format decision section for deciding a frame format of which guard interval length is different for each slot based on the receive state of each mobile station; and
   a slot assignment section for assigning each slot of the frame format to data for a mobile station,
   wherein the frame format decision section judges whether it is necessary to update the frame format, and updates the frame format if update is necessary.

2. The radio communication apparatus according to claim 1, wherein the slot assignment section assigns each slot of the frame format to data for each mobile station based on a receive state of each mobile station in a cycle shorter than the update period of the frame format.

3. A radio communication apparatus for forming a frame with a plurality of slots, and inserting a guard interval into each slot along with data for a mobile station to perform communication, comprising:
   a receive state acquisition section for acquiring a receive state of each mobile station;
   a frame format decision section for deciding a frame format of which guard interval length is different for each slot based on the receive state of each mobile station; and
   a slot assignment section for assigning each slot of the frame format to data for a mobile station,
   wherein the radio communication apparatus further comprises a frame format reporting section for reporting the decided frame format to mobile stations.

4. A radio communication apparatus for forming a frame with a plurality of slots, and inserting a guard interval into each slot along with data for a mobile station to perform communication, comprising:
   a receive state acquisition section for acquiring a receive state of each mobile station;
   a frame format decision section for deciding a frame format of which guard interval length is different for each slot based on the receive state of each mobile station; and
   a slot assignment section for assigning each slot of the frame format to data for a mobile station,
   wherein the receive state acquisition section acquires a delay spread as a receive state of each mobile station, and the frame format decision section decides the frame format based on the delay spreads of mobile stations.

5. The radio communication apparatus according to claim 4, wherein the receive state acquisition section acquires the delay spread from a mobile station which has means of estimating a delay spread based on a downlink signal, quantizing the delay spread, and reporting the quantitized delay spread to the base station.

6. The radio communication apparatus according to claim 4, wherein the receive state acquisition section comprises a delay spread estimation section for estimating a delay spread of each mobile station based on an uplink signal from each mobile station.

7. A radio communication apparatus for forming a frame with a plurality of slots, and inserting a guard interval into each slot along with data for a mobile station to perform communication, comprising:
   a receive state acquisition section for acquiring a receive state of each mobile station;
   a frame format decision section for deciding a frame format of which guard interval length is different for each slot based on the receive state of each mobile station; and
   a slot assignment section for assigning each slot of the frame format to data for a mobile station,
   wherein the receive state acquisition section acquires a delay spread as a receive state of each mobile station, and the frame format decision section prepares a plurality of slot formats of which guard interval lengths are different in advance, determines distribution of the delay spread based on the delay spreads of mobile stations, and assigns a predetermined slot format to each slot constituting the frame according to the distribution of the delay spread to determine the frame format.

8. The radio communication apparatus according to claim 7, wherein the frame format decision section judges whether it is necessary to update the frame format and updates the frame format if update is necessary, and the slot assignment section assigns each slot of the frame format to data for each mobile station based on a delay spread of each mobile station in a cycle shorter than the update period.

9. The radio communication apparatus according to claim 7, wherein an effective symbol length of the slot formats of which guard interval lengths are different, is constant.

10. The radio communication apparatus according to claim 7, wherein a total symbol length of an effective symbol length of the slot formats of which guard interval lengths are different and the guard interval length is constant.

11. The radio communication apparatus according to claim 8, wherein the slot assignment section assigns mobile station data with small path delay with priority if the mobile station data cannot be assigned to an optimum slot due to the deviation of the delay spread distribution of the mobile stations.

12. The radio communication apparatus according to claim 8, wherein the slot assignment section assigns mobile station data to a slot even if the guard interval is smaller than the path delay if the mobile station data cannot be assigned to an optimum slot due to the deviation of delay spread distribution of the mobile stations.

13. A communication method for a radio communication apparatus for forming a frame with a plurality of slots, and inserting a guard interval into each slot along with data for a mobile station to perform communication, comprising:

acquiring a receive state of each mobile station;

deciding a frame format of which guard interval length is different for each slot based on the receive state of each mobile station; and assigning each slot of the frame format to data for a mobile station, wherein the deciding frame format further comprises judging whether it is necessary to update the frame format, and updating the frame format if update is necessary.

14. The communication method according to claim 13, wherein the allocating a slot further comprises assigning each slot of the frame format to data for a mobile station based on a receive state of each mobile station in a cycle shorter than the update period of the frame format.

15. A communication method for a radio communication apparatus for forming a frame with a plurality of slots, and inserting a guard interval into each slot along with data for a mobile station to perform communication, comprising:

acquiring a receive state of each mobile station;

deciding a frame format of which guard interval length is different for each slot based on the receive state of each mobile station; and assigning each slot of the frame format to data for a mobile station, wherein the acquiring a receive state further comprises acquiring a delay spread as a receive state of each mobile station, and the deciding a frame format further comprises-deciding the frame format based on the delay spread of mobile stations.

16. The communication method according to claim 15, wherein the acquiring a receive state further comprises acquiring the delay spread from the mobile station.

17. The communication method according to claim 15, wherein the acquiring a receive state further comprises estimating a delay spread of each mobile station based on an uplink signal from each mobile station.

18. A communication method for a radio communication apparatus for forming a frame with a plurality of slots, and inserting a guard interval into each slot along with data for a mobile station to perform communication, comprising:

acquiring a receive state of each mobile station;

deciding a frame format of which guard interval length is different for each slot based on the receive state of each mobile station; and assigning each slot of the frame format to data for a mobile station, wherein the acquiring a receive state further comprises acquiring a delay spread as a receive state of each mobile station, and the deciding a frame format further comprises preparing a plurality of slot formats of which guard interval lengths are different in advance, determining the distribution of the delay spread based on the delay spreads of mobile stations, and assigning a predetermined slot format to each slot constituting the frame according to the distribution of the delay spread, to determine the frame format.

19. The communication method according to claim 18, wherein the deciding a frame format further comprises judging whether it is necessary to update the frame format and updating the frame format if update is necessary, and the assigning a slot further comprises assigning each slot of the frame format to data for a mobile station based on a delay spread of each mobile station in a cycle shorter than the update period of the frame format.

20. The communication method according to claim 18, wherein the assigning a slot further comprises assigning mobile station data with small path delay with priority if the mobile station data cannot be assigned to an optimum slot due to the deviation of delay spread distribution of the mobile stations.

21. The communication method according to claim 18, wherein the assigning a slot further comprises assigning mobile station data to a slot even if the guard interval is smaller than the path delay if the mobile station data cannot be assigned to an optimum slot due to the deviation of delay spread distribution of the mobile stations.

\* \* \* \* \*